(12) United States Patent
Johnstad

(10) Patent No.: US 7,453,763 B2
(45) Date of Patent: Nov. 18, 2008

(54) GEOPHYSICAL DATA ACQUISITION SYSTEM

(75) Inventor: Svein Erling Johnstad, Bønes (NO)

(73) Assignee: Norsk Hydro ASA, Olso (NO)

( * ) Notice: Subject to any disclaimer, the term of this patent is extended or adjusted under 35 U.S.C. 154(b) by 0 days.

(21) Appl. No.: 10/562,825

(22) PCT Filed: Jun. 18, 2004

(86) PCT No.: PCT/NO2004/000181

§ 371 (c)(1),
(2), (4) Date: Apr. 20, 2006

(87) PCT Pub. No.: WO2005/006022

PCT Pub. Date: Jan. 20, 2005

(65) Prior Publication Data

US 2006/0238200 A1    Oct. 26, 2006

(30) Foreign Application Priority Data

Jul. 10, 2003    (NO) .................................. 20033169

(51) Int. Cl.
*G01V 1/00* (2006.01)
(52) U.S. Cl. ........................ 367/20; 367/141; 181/111
(58) Field of Classification Search ................. 367/20, 367/141; 181/111
See application file for complete search history.

(56) References Cited

U.S. PATENT DOCUMENTS

| | | | |
|---|---|---|---|
| 4,617,518 A * | 10/1986 | Srnka ........................ 324/365 |
| 5,486,764 A | 1/1996 | Thompson et al. |
| H1561 H * | 7/1996 | Thompson ................. 367/188 |
| 5,841,280 A * | 11/1998 | Yu et al. ..................... 324/323 |
| 6,227,293 B1 * | 5/2001 | Huffman et al. ........... 166/248 |
| 6,427,774 B2 * | 8/2002 | Thomas et al. ............. 166/248 |
| 6,477,113 B2 * | 11/2002 | Hornbostel et al. .......... 367/38 |
| 6,541,975 B2 * | 4/2003 | Strack ........................ 324/323 |
| 6,584,406 B1 * | 6/2003 | Harmon et al. ................ 702/6 |

(Continued)

FOREIGN PATENT DOCUMENTS

WO    95/24658    9/1995

OTHER PUBLICATIONS

Hou et al. Reservoir-parameter identification using minimum relative entropy-based Bayesian inversion of seismic AVA and marine CSEM data. Geophysics. vol. 71, No. 6. Nov.-Dec. 2006.*

(Continued)

*Primary Examiner*—Mark Hellner
(74) *Attorney, Agent, or Firm*—Wenderoth, Lind & Ponack, L.L.P.

(57) ABSTRACT

The invention includes a geographical sensor apparatus for use under water in the sea, including a plurality of seismic sensors (1) for sensing seismic waves associated with underground formations, and a plurality of EM-sensors constituted preferably by electrodes (4) for sensing electromagnetic waves associated with the underground formations. In a preferred receiver cable configuration embodiment of the invention, the geophysical sensor apparatus includes a seismic receiver cable with a linear array of a plurality of seismic sensors (1) and EM-sensors arranged inside a flexible outer skin (25), with the EM-sensors having electrodes on the outside of the outer skin. The cable is operated on the seafloor by a surface vessel, the vessel towing an electromagnetic transmitter antenna in addition to the seismic source.

26 Claims, 8 Drawing Sheets

U.S. PATENT DOCUMENTS

| | | | | |
|---|---|---|---|---|
| 6,628,119 | B1 * | 9/2003 | Eidesmo et al. | 324/337 |
| 6,739,165 | B1 * | 5/2004 | Strack | 702/13 |
| 6,823,262 | B2 * | 11/2004 | Bahorich et al. | 702/1 |
| 6,842,006 | B2 * | 1/2005 | Conti et al. | 324/350 |
| 6,859,038 | B2 * | 2/2005 | Ellingsrud et al. | 324/334 |
| 6,864,684 | B2 * | 3/2005 | Ellingsrud et al. | 324/337 |
| 6,900,639 | B2 * | 5/2005 | Ellingsrud et al. | 324/337 |
| 7,023,213 | B2 * | 4/2006 | Nichols | 324/348 |
| 7,042,801 | B1 * | 5/2006 | Berg | 367/14 |
| 7,203,599 | B1 * | 4/2007 | Strack et al. | 702/2 |
| 2005/0077902 | A1 * | 4/2005 | MacGregor et al. | 324/334 |
| 2006/0186887 | A1 * | 8/2006 | Strack et al. | 324/336 |

OTHER PUBLICATIONS

Pratt, Dave. Controlled source electromagnetic imaging offers synergies with seismic, well-log data. Oil & Gas Journal. vol. 104, No. 37. pp. 33-36.*

* cited by examiner

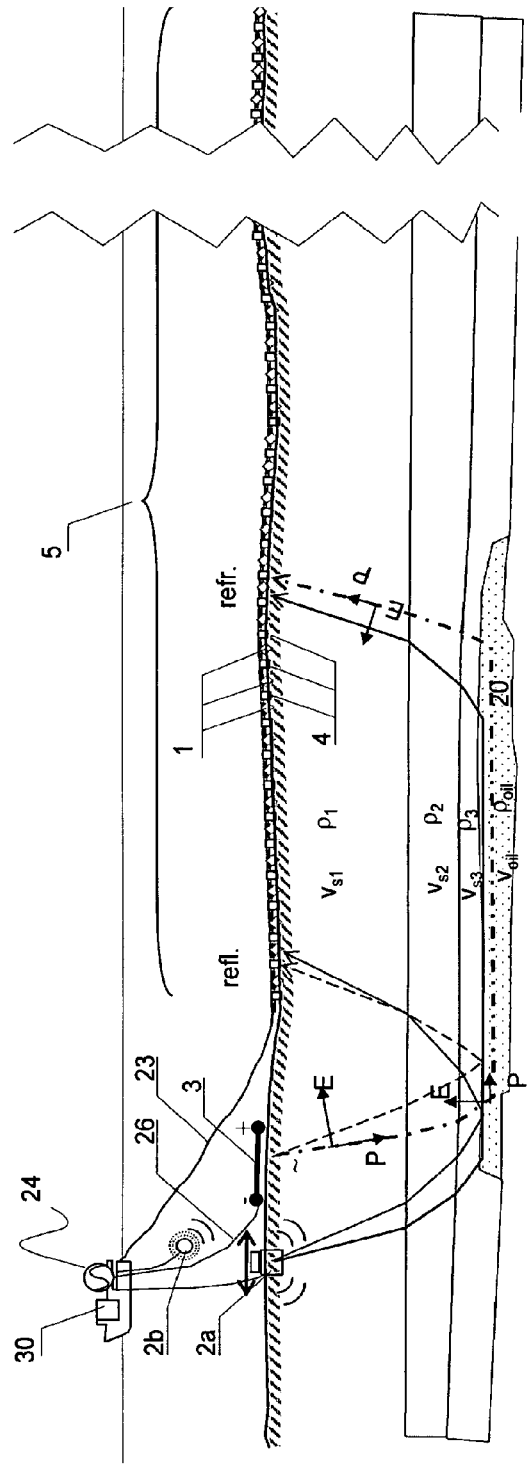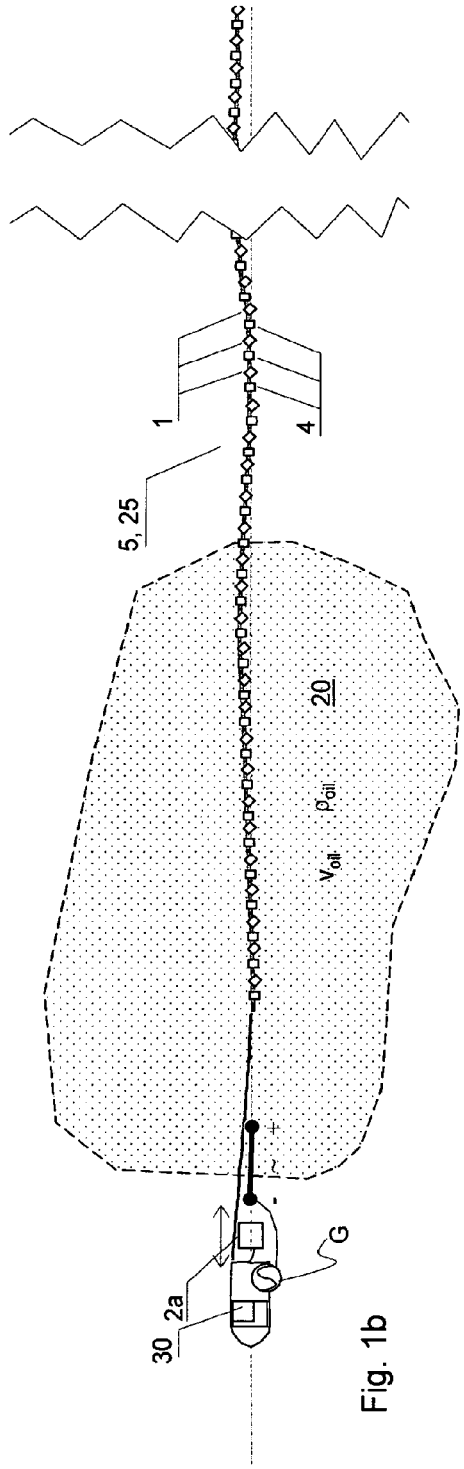
Fig. 1a
Fig. 1b

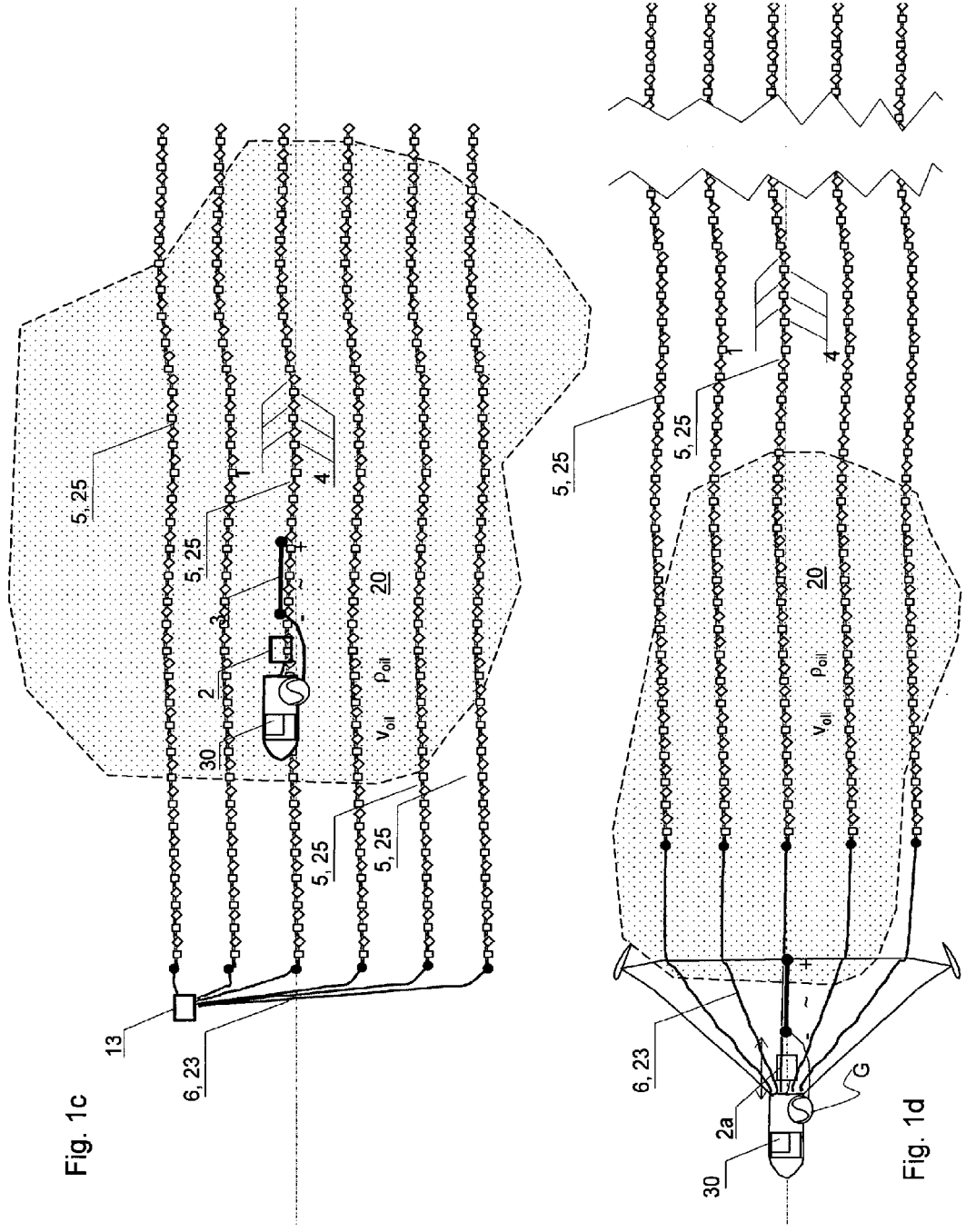

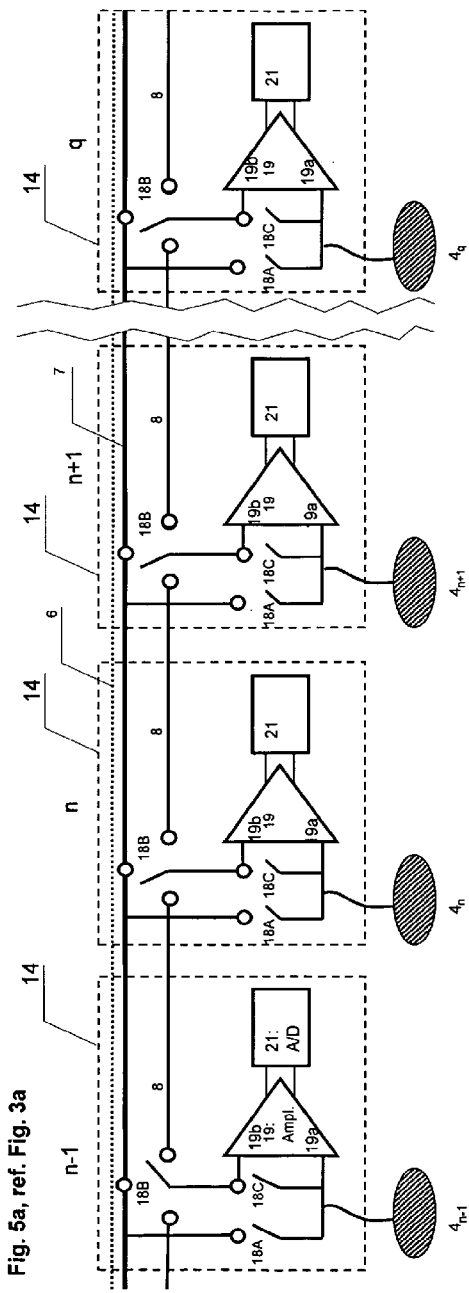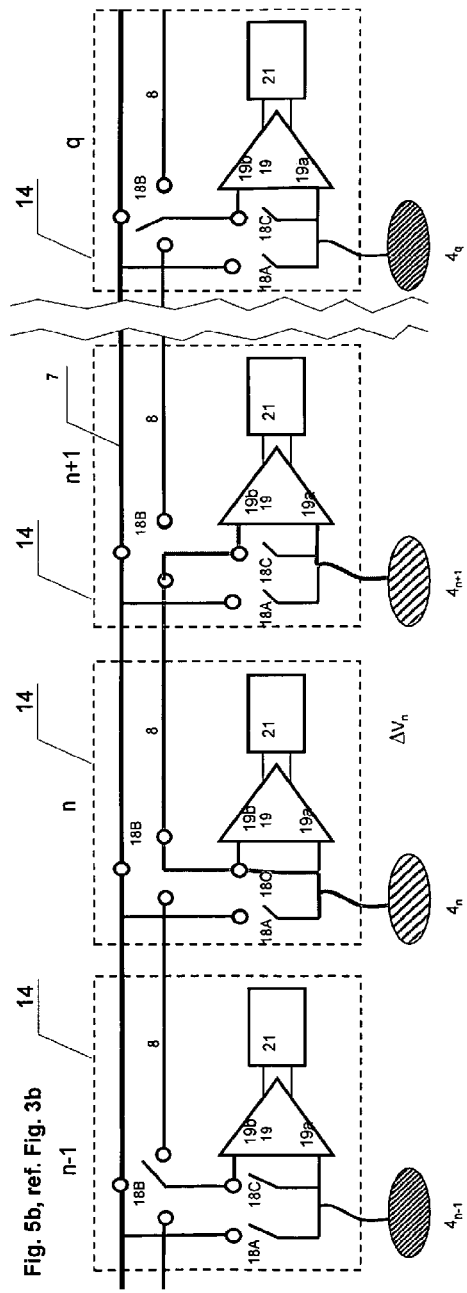

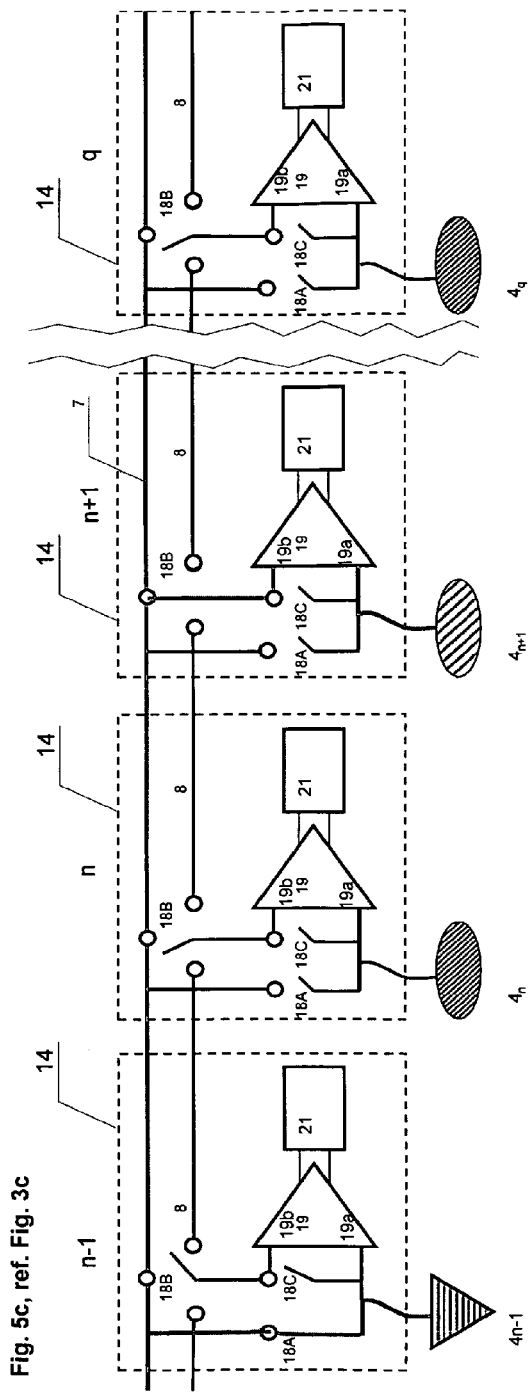
Fig. 5c, ref. Fig. 3c
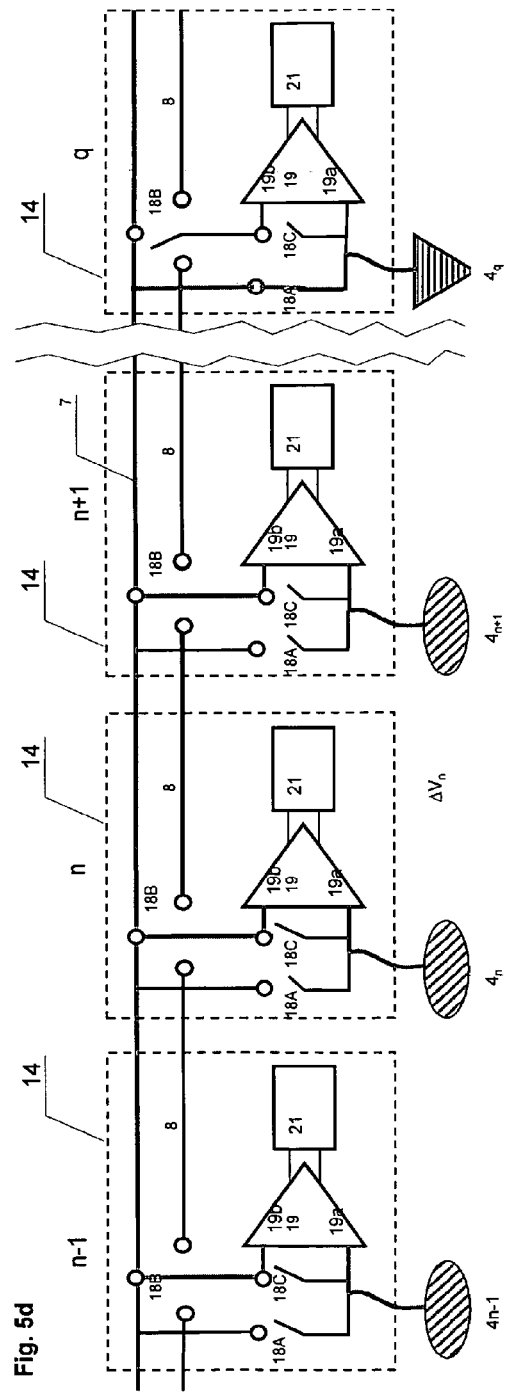
Fig. 5d

GEOPHYSICAL DATA ACQUISITION SYSTEM

INTRODUCTION

The invention relates to a combination of seismic sensors (hydrophones and/or geophones and/or accelerometers) and electromagnetic sensors (electrical and/or magnetic), in which the sensor apparatus can be submerged in sea-water. Seismic and electromagnetic waves emitted by corresponding signal sources are refracted and reflected through the geological underground strata and picked up by corresponding sensors.

More specifically, the invention is an apparatus which integrates two different geophysical receiver systems, seismic and electromagnetic, in a combined unit for use in the marine environment for petroleum prospecting/exploration and reservoir monitoring. The combination of the two methods will increase the value of the data to more than the sum of the two individual data sets, as more accurate combined mapping and monitoring may be achieved (as the relative receiver positions are constant and the spatial sampling is dense), and more conclusive interpretation would be possible (as two independent types of geophysical data is included in the data). In addition, as two different data sets may be acquired with one set receiver system instead of two, the data acquisition cost may be reduced considerably. The concepts allow recording of the seismic and electromagnetic data simultaneously, or one type of data set at a time. Typically the receivers may receive signals generated from seismic p-wave sources and/or EM sources in the water column and/or seismic p- and s-wave sources and/or EM sources on the sea floor, typically in the frequency band from zero to a few hundred hertz. The sources may be mobile or stationary. The receiver system would also record data from so called seismo-electric and electro-seismic effects, where EM waves are generated from seismic waves and vice versa.

EXAMPLES OF KNOWN ART

Numerous examples exist in which an electromagnetic receiver cable (or streamer) does not incorporate hydrophones:

U.S. 6,236,212 Wynn describes a streamer cable having electrodes to pick up signals from layers in the sea-beds, and is provided with a tail arranged for being pulled along the seafloor and for injecting electrical square pulses into the sediments. The receivers at the cable are used to detect any secondary signals produced by induced polarization from a source located on or beneath the sea floor in response to this electrical current.

U.S. 4,617,518 Srnka is also an electromagnetic streamer (receiver cable) without hydrophones, and is provided with transmitter electrodes and several pairs of receiver electrodes.

U.S. 5,770,945 Constable uses a magnetotelluric sensor having pairs of electrodes for measuring electromagnetic signals. Booms arranged in an X-configuration carry electrodes at the ends of each boom. But Constable's apparatus lacks geophones or other seismic sensors, and thus cannot acquire electromagnetic and seismic data simultaneously.

An electromagnetic transmitter antenna and a series of receiver antennas are described in international patent application PCT/GB99/02823-WO00/13046 Eidesmo. The transmitter antenna and the receiver antennas are arranged along a cable without hydrophones or geophones. The cable shall be arranged along the seafloor. Eidesmo proposes in claim 22 to conduct a seismic prospecting firstly, and subsequently to conduct an electromagnetic prospecting. This is a time-consuming sequence of performing a marine seismic prospecting for oil, but no equipment known to us at the time of filing this application is arranged for conducting a simultaneous seismic and EM acquisition.

Another seismic apparatus is described in PCT/US94/02626 Birdwell, "Method and apparatus for detecting local precursor seismic activity". An apparatus for detecting acoustic waves generated by naturally occurring seismic activity in the earth, having frequencies between 0 and 15 Hz, and electromagnetic waves having frequencies between 0 and 35 Hz, in order to forecast an earthquake. The apparatus comprises an infrasound detector, an antenna and an accelerometer. However, the apparatus is not designed for use in seismic prospecting, and does neither comprise any seismic streamer or receiver cable.

An electromagnetic transmitter on the seafloor and an electromagnetic receiver arranged having an offset distance from the transmitter, also on the seafloor, is described in PCT/GB01/00419 Ellingsrud, "Method and apparatus for determining the nature of subterranean reservoirs". Reflected and refracted waves are sought for in the wavefield response in order to possibly find a reservoir.

STATEMENT OF PROBLEM

Novel use of marine controlled-source electromagnetic sounding techniques, so-called "marine CSEM" or "seabed logging" (SBL), may be used for direct hydrocarbon identification over a shallow prospect in deep water. Another method which can be used for direct hydrocarbon identification is the seabed seismic technique. Both techniques use receivers on the seabed and a source is towed and so-called amplitude variation with offset "AVO"-analysis is used to estimate a fluid content in a reservoir. Both methods can also be used in reservoir monitoring for tracing fluid movement or fluid volume change. In the known art, these two methods are not integrated. Both methods are very expensive due to high data acquisition cost, as expensive dynamic-positioning vessels normally are required for the operation. The cost for an individual survey would typically be in the order of US$ 1 million. Obviously, if these two methods could be combined and particularly the EM-part improved according to the invention, major costs could be saved in simultaneous data acquisition, improved relative data acquisition positions and relative sensor directions between acquired seismic and EM sensors, could be achieved. Further, more data and more dense and dynamic sensor combinations may be achieved, giving improved data quality (particularly for the EM) and increased value of combined data processing and data interpretation, resulting in more precise hydrocarbon identification.

The fact that EM signals, which will generate a voltage signal in an EM signal sensor, almost as a seismic sensor would do, easily may be conditioned by low noise pre-amplification and then recorded on a seismic recorder system, opens a new dimension for dense and high quality EM-data recording in combination of multi receiver (multi channel) seismic receiver system, as for example the seabed seismic receiver cable system. Further, the proposed system may facilitate a selectable EM-separation length. The increase in EM data quality as a result of such an EM system alone, would increase the investigation depth, resolution and overall ability to identify hydrocarbons in a reservoir, compared to the known art in marine EM technology.

BRIEF DESCRIPTION OF THE DRAWINGS

The invention is illustrated in the following drawings, of which drawings are made for illustrating the invention only, and shall not be construed to limit the invention, which shall only be limited by the attached claims.

FIG. 1a and FIG. 1b illustrate simplified images in plane view and side elevation, respectively, of the method of seabed seismic data acquisition according to the invention, in which the seismic receivers are arranged in a linear array of receivers at the seafloor, and in which the seismic source (an airgun, the transmitter) is arranged in the sea, behind a signal or "shooting" vessel. In the illustrated situation, the vessel may move the entire streamer cable between each signal transmission position ("dragged array"), or a second vessel may be towing the source while the vessel connected to the receiver array records the data FIG. 1 further illustrates a simplified sketch of the method of seabed electromagnetic data acquisition in a similar manner in which electromagnetic receivers are arranged at the seafloor in the same linear array, and in which an electromagnetic antenna transmits EM waves into the seawater, further propagating into the seabeds and down to a low-conductivity petroleum reservoir, and refracting/reflecting back to the EM receiver array in the receiver cable.

FIG. 1c illustrates an embodiment of the invention in which an array of streamer cables comprising EM-sensors and seismic sensors (which may be geophones or hydrophones or both) is fixedly arranged on the seafloor, and a signal vessel is crossing the area in a desired pattern with an EM-signal source and a seismic source, which may be a seafloor vibrator or an airgun.

FIG. 1d illustrates a configuration in which a ship tows the entire array of streamers with the sensors between each signal generating station, the streamers preferably resting at the seafloor during signal generation and acquisition.

FIG. 5a illustrates the EM components of a seabed cable segment having electromagnetic receiver electrodes, amplifiers and A/D converters according to one preferred embodiment of the invention.

FIG. 5b illustrates an embodiment of the invention in which one particular electrode is used as a voltage reference electrode for an adjacent neighbour electrode.

FIG. 5c illustrates an embodiment of the invention in which one particular electrode is used as a voltage reference electrode for a second particular electrode, for obtaining a desired sensor electrode separation.

FIG. 5d illustrates an embodiment of the invention in which one particular electrode is used as a voltage reference electrode for several other electrodes, for obtaining a common ground reference electrode.

ADVANTAGES OF THE INVENTION

Figure 2:
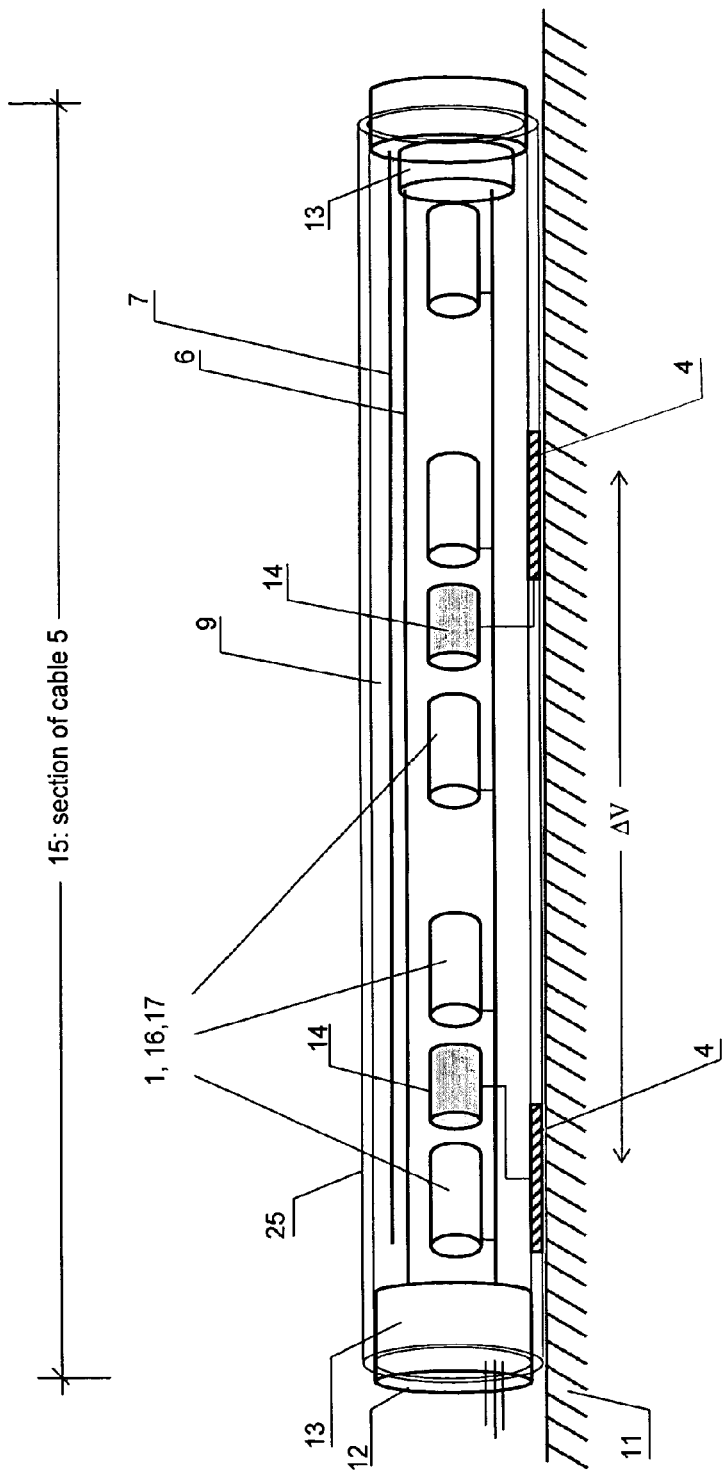
FIG. 2 illustrates a receiver cable section according to the invention, comprising seismic sensors, and electromagnetic sensors connected to electromagnetic amplifiers in electronic packages.

Known receiver position and orientation, facilitates cross-line and in-line EM response separation and therefore make the EM data more suited for hydrocarbon identification.

Common seismic and EM receiver location facilitates an integrated and combined seismic and EM data interpretation. Hydrocarbon indicator estimates become more precise.

Increased amounts of field acquisition data (dense spatial sampling, short separation between receivers, and selectable sensor separation length between sensor electrode pairs) improves the EM data quality and processing possibilities/options.

Possibility to select long EM-sensor separation improves sensitivity, spacial resolution and increase depth of investigation).

A combined EM and seismic receiver system saves data acquisition time.

Reduced cost of operation.

Even though the combination of a seismic and EM acquisition apparatus seemingly would be obvious, it is a fact that Eidesmo et al. have been very close to the idea of combining seismic and EM equipment, without actually doing so. The invention contradicts the usual idea of two such operations having to be conducted through two separate operations. Eidesmo uses only the seismic structural information, structures interpreted from marine seismic data, to interpret the difference in EM response on and off a structure (a potential hydrocarbon trap) which may or may not contain hydrocarbons. He does not combine direct hydrocarbon indicators from seismic data analysis (as e.g. AVO), and does not see the large synergies in combined direct hydrocarbon indicator interpretations and the possibilities for improved data quality, prediction accuracy and cost efficiency in a combined system as described in this invention. The synergies resulting from the combination of a seismic and EM acquisition apparatus (as described in this document) in a combined approach are surprisingly high, beyond know art.

DETAILED DESCRIPTION OF PREFERRED EMBODIMENTS OF THE INVENTION

The invention relates to a marine geophysical acquisition system illustrated in the enclosed FIGS. 1a (plane view) and 1b (side elevation view), and also in FIG. 1c, FIG. 1d, and FIGS. 3a-f, comprising the following features:

One or more seismic signal sources 2 for being arranged in the sea or at the seafloor and for emitting seismic signals. The seismic signal source may be an airgun in the water masses producing P-waves, or a seismic vibrator arranged for producing P- and or S-waves in the seafloor.

A plurality of seismic sensors 1 are arranged on a receiver cable 5. The receiver cable is made for being extended in the sea, either towed behind a vessel 30 in the water masses or the receiver cable may preferably be arranged on the seafloor during the measurement, for reasons to be explained below. The seismic sensors 1 are for sensing propagated seismic signals emitted from the signal source 2 and propagating through the geological formations constituting the seabeds above a reservoir 20, and partially reflected and/or refracted back upwards through the overlying geological formations. The novelty of the invention mainly relates to the combination of such a geophysical acquisition system with such a seismic receiver cable combined with the following features:

At least one electromagnetic (EM) signal source 3 is arranged in the sea, either in the water masses, or at the sea floor. The signal source 3 is provided with a varying voltage current signal for emitting EM-signals which will propagate through the seafloor, down to the reservoir 20, and for being picked up by electromagnetic sensors 4.

A plurality of the mentioned electromagnetic sensors 4 are arranged along the receiver cable 5, in which the sensors 4 have generally fixed distance relations with the seismic sensors 4 along the streamer cable 5. The electric sensors 4 may be otherwise associated with the receiver cable, as being arranged a desired distance to the side of the receiver cable, but otherwise connected to the receiver cable.

Figure 3:
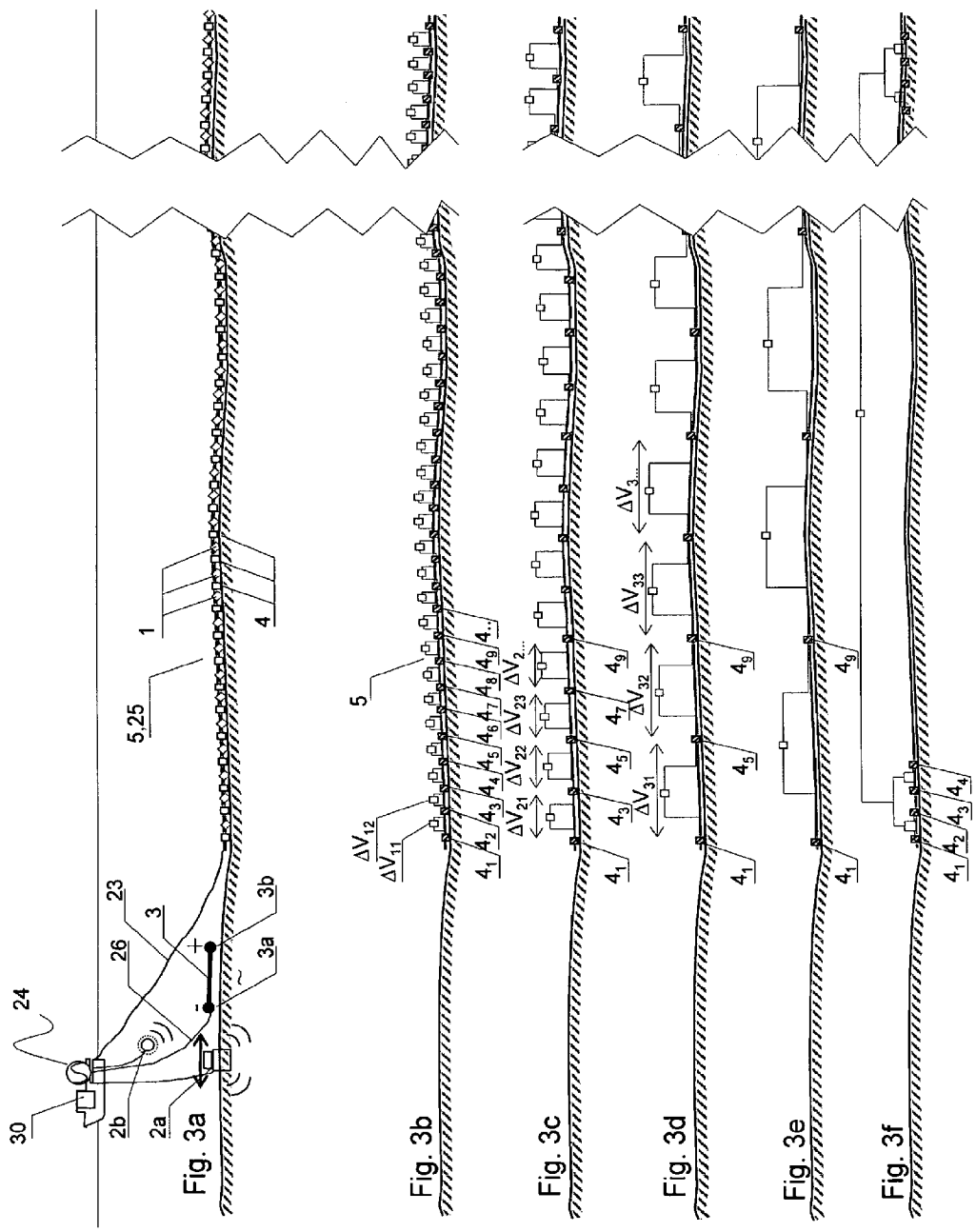
FIG. 3a illustrates a marine acquisition system comprising a vessel receiving measurements from a receiver cable, and having one or more seismic sources like an airgun device and/or a seafloor vibration source, and an electromagnetic transmitter in the sea, preferably at the seafloor.
FIGS. 3b, c, d, e and f are illustrations of different EM-receiver antenna configurations, and in FIG. 3b, each consecutive pair of electrodes pick up a voltage comprised in the EM signal that reaches that particular part of the receiver cable.
FIGS. 3c, d and e illustrate doubling and redoubling of the sensor pair length between connected EM sensor electrodes.
FIG. 3f shows connection of two or more electrodes in one group which is remote from another group of coupled electrodes, the large separation improving the signal to noise ratio considerably for the EM voltage measurement.

In a preferred embodiment of the invention, the EM signal source 3 is provided with electrical power through an insulated electric cable 26 connected to an electric signal generator 24 aboard a marine vessel 30, as illustrated in FIGS. 1a, 1b and 3a.

The receiver cable 5 has in the preferred embodiment a lead-in, umbilical or riser cable 23 shown in FIGS. 1a and 3a, conducting power from the vessel, and signals to and from the vessel 30, in case the system shall be moved between data acquisitions or otherwise be operated for a short period.

Seafloor Streamer Cable

The marine geophysical acquisition system according to a preferred embodiment of the invention has the receiver cable 5 arranged with a negative buoyancy. Thus the streamer cable is made for residing on the seafloor at least during data acquisition using the EM sensors 4. Using the receiver cable on the seafloor will prevent attenuation in sea-water of EM-waves propagating upwards from underneath geological formations, and prevent or attenuate noise generated by relative water movement close to the sensor and noise propagating from the air or wave action and downwards through the water layer. Likewise, using the EM source on the seafloor will prevent electromagnetic signal loss in seawater.

In-line EM-source and EM-Receiver Cable

According to a preferred embodiment of the invention, the marine geophysical acquisition system will advantageously have the EM signal source positioned along a long axis of the receiver cable 5 with the plurality of electromagnetic sensors 4. Also, the receiver cable 5 should be generally linear as seen in a vertical projection on the horizontal plane, i.e. as seen from above.

Even more advantageous is the arrangement having a bipolar EM signal source 3 having its bipolar axis 3a directed more or less in the same plane as the receiver cable 5. The reason for this is that an EM wave refracted and/or reflected from the hydrocarbon reservoir in this mode will have a strong horizontal component along the receiver cable axis. This corresponds very well with the EM sensors being arranged having selectable horizontal separations along the cable.

Local Electronic EM Units with Amplifier

In a preferred embodiment of the invention illustrated in FIG. 5a, the streamer cable provided with electronic units $14_1, 14_2, \ldots, 14_{n-1}, 14_n, 14_{n+1}, \ldots, 14_q, \ldots$ Each electronic unit $14_n$ is provided with a voltage amplifier $19_n$ having a first voltage input line 19a and a second voltage input line 19b, the input lines 19a, 19b for being connected to separate electrodes 4.

The first voltage input line 19a is connected to an electrode $4_n$. The voltage amplifier output is connected to an analog-to-digital signal converter $21_n$. The voltage amplifier $19_n$ is made for amplifying an alternating voltage difference between at least two electrodes 4n, 4x, the electrodes picking up the remote signal from the EM signal source.

Common Ground Line

In a preferred embodiment of the invention, the streamer cable is provided with a common ground line 7. One or more of the electrodes $4_n$ is arranged for being connectable through a first switch $18A_n$ to this common ground line 7. Thus a selected electrode will constitute a reference ground voltage for one or more other electrodes 4. The switches mentioned in this application are generally considered to be remotely operated, e.g. through a common signal line 6 from said vessel 30.

The electrode pairs separation may be selected according to desire, e.g. for selecting a particular spatial resolution and sensitivity (which is proportional to electrode separation), by switching relevant switches to connect a pair of sensor electrodes or antennas to an amplifier. This will increase the sensitivity and improve the signal to noise ratio considerably for EM-data acquisition. Using long sensor electrode separation may facilitate measurement when the reservoir response is weak, or when noise is present. In the existing technology, e.g. in Scripps apparatus, it is difficult to obtain a large electrode separation. Also, it is difficult using the known art to arrange sufficiently densely arranged electrodes. The invention makes possible any desired combination of separations of electrodes, e.g. 10 to 100 meters or more. With a cable according to the invention, the user will simply have more and higher sensitivity EM data collected for desired electrode separations, and this gives faster, better and less expensive data acquisition than what is provided by the known art.

Local Ground Line

In the same preferred embodiment of the invention, the electrode $4_n$ is connectable via a second switch $18C_n$ to the second voltage input line $19B_n$ and further connected to a third switch $18B_n$ to a local ground line $8_n$ to a similarly arranged switch $18B_{n+1}$ on a nearest-neighbour electronic unit $14_{n+1}$. The switch $18B_{n+1}$ is further connected to a second voltage input line $19B_{n+1}$ of a voltage amplifier $19_{n+1}$ of the nearest-neighbour electronic unit $14_{n+1}$. This situation is shown in FIG. 5b, in which the described relevant switches are closed in order for the amplifier $19_{n+1}$ is given a signal by electrodes $4_n$ and $4_{n+1}$.

Voltage A/D Conversion

In the embodiment of the invention, the amplified varying voltage signal $V21a_n$ is digitized to a digitized voltage signal V21$d_n$ using an analog-to-digital signal converter 21$_n$ as illustrated in FIG. 5a. The digitized voltage signal V21$d_n$ is transmitted along the above-mentioned main signal line 6 to a data storage means 36. The data storage 36 is preferably arranged on the vessel 30, for storage and analysis of the digitized voltage signal 21$d_n$. In an alternative embodiment, illustrated in FIG. 1c, the data storage means 13 may be arranged in a water-proof submerged container and connected to one or more streamer cables 5, for being transported to the surface for data analysis after the signal acquisition procedure has been conducted. This latter situation may be relevant for a permanently arranged system of streamer cables on the seafloor, for long-term reservoir monitoring, running a ship with EM and seismic sources according to a desired time schedule.

Using One Electrode as a Common Reference Electrode

In one embodiment of the invention, the streamer cable may be adapted for measuring one or more varying voltage signals in the environment by using an electrode 4$_q$ connected to an electronic unit 14$_q$ as a common reference electrode. With the embodiment illustrated in FIG. 5d, switch 18A$_q$ may be closed for connected electrode 4$_q$ to the common ground line 7. Closing switch 18B$_n$ will connect the second input line 19$b_n$ on amplifier 19$_n$ to the common ground line 7, for using 14$q$ as a reference electrode for measuring a varying signal V21$a_n$ on electrode 4$_n$.

The Receiver Cable

In the marine geophysical acquisition system according to one aspect of the present invention, the receiver cable 5 has a flexible, electrically insulating and water-proof outer skin 25. The receiver cable skin 25 is generally continuous and of generally equal diameter over the entire length of the receiver cable 5, like low acoustic-noise towed receiver cables, and has a cavity or series of preferably fluid-containing cavities 9 for resisting external pressure and for containing the EM electronic units 14, the electrodes 4 being arranged with one surface extending on the outside of the skin 25 to be in direct electrical contact with the sea or the seafloor, as illustrated in FIG. 2.

Alternatively, the receiver cable may be arranged having separate instrument units separated by signal/voltage cable sections, in which the receiver cable 5 comprises separate instrument unit cans 10 comprising seismic sensors 1 and EM sensor electrodes 4, and the instrument unit cans being connected by signal and voltage conducting cable sections 15$b$. Such a seafloor cable may have multiple seismic/electric sensor units, separated typically 10-50 m. The units and cables may typically be plastic/rubber insulator coated to avoid corrosion potential noise to the electrodes.

The receiver cable 5 having seismic 1 and electromagnetic 4 sensors may be made from two or more receiver cable sections 15. The receiver cable sections 15 may comprise both EM sensor electrodes 4 and seismic sensors 1 in one section. Alternatively, the receiver cable may be divided in separate sections 15, one of the types being EM receiver cable sections 15$_{EM}$ generally comprising EM sensor electrodes 4, with each EM receiver cable section 15$_{EM}$ arranged in line with and between seismic receiver sections 15$_S$ generally comprising generally seismic sensors 1.

The EM types of signal sensors 4 signal may be amplified and digitized using amplifiers otherwise used for one of the seismic sensors, e.g. a hydrophone amplifier and digitizer line, leaving the geophone amplifier and digitizer for their normal use, and using the ordinary seismic receiver signal line 6 for transmitting both the EM signal and the seismic signal in their digitized form. Alternatively, an additional amplifier and digitizer channel may be arranged for the EM sensors.

Fixed Array for Monitoring

According to a preferred embodiment of the invention illustrated in FIG. 1c, the marine geophysical acquisition system may be arranged with one or more receiver cables 5 arranged as a fixed array of sensors 1, 4 in one line or in a grid on the seafloor. This system may then be traversed by a vessel carrying a seismic and/or an EM signal source for data acquisition. Data may be collected directly to the vessel or to a data storage unit 13 on the seafloor, and the data storage unit 13 may be arranged to release and be picked up after a desired signal or delay time, for transferring the collected data to the vessel for later analysis. The data may also be collected on-line via main signal line 6 to a surface vessel or platform during signal acquisition.

Seismic Wave Source

The marine geophysical acquisition system according to the invention may use a seismic source being a seismic shear wave source arranged on the seafloor or in the seabeds, preferably a seismic vibrator 2a of vertical or horizontal polarization. The system may alternatively use a seismic source being a pressure wave source, preferably an airgun, towed behind the vessel 30 or towed by a separate seismic signal vessel.

EM-Transmitter

The electromagnetic source 3 may be rather simple, comprising two electric transmitter electrodes 3a, 3b arranged with a separation in the sea water, with the electrodes 3a, 3b being provided with a desired electric voltage and current signal through a pair of insulated electric cables 26 from an electric generator 24, preferably aboard the vessel 30. The power to the EM-source 3 may also be transferred via a high-voltage line from the vessel to prevent ohmic loss, and being transformed to a low-voltage/strong current signal for being supplied to the EM-source by a transformer near the EM-source 3.

Seismic Electronics

In a preferred embodiment of the invention, the receiver cable 5 comprises seismic electronic units 16$_n$ like in the the known art, comprising one or more seismic electronic amplifiers 17$_n$ for amplifying seismic sensor 1 output signals V17$_n$, and A/D converters 22$_{Sn}$ for digitizing the amplified voltage signal V22$_{Sn}$ from the seismic electronic amplifiers 17 to digitized seismic voltage signals S22$_{Sn}$, and transmitting the digitized voltage signal S22$_{Sn}$ along the main signal line 6 to a data storage means 36 preferably arranged on the vessel 30, for storage and analysis of the digitized seismic signals S22$_{Sn}$.

Seafloor Receiver Cable

In the preferred embodiment of the invention, the EM source 3 is arranged directly on the seafloor in order to prevent sea-water signal loss in the downwardly propagating EM wave.

Figure 4:
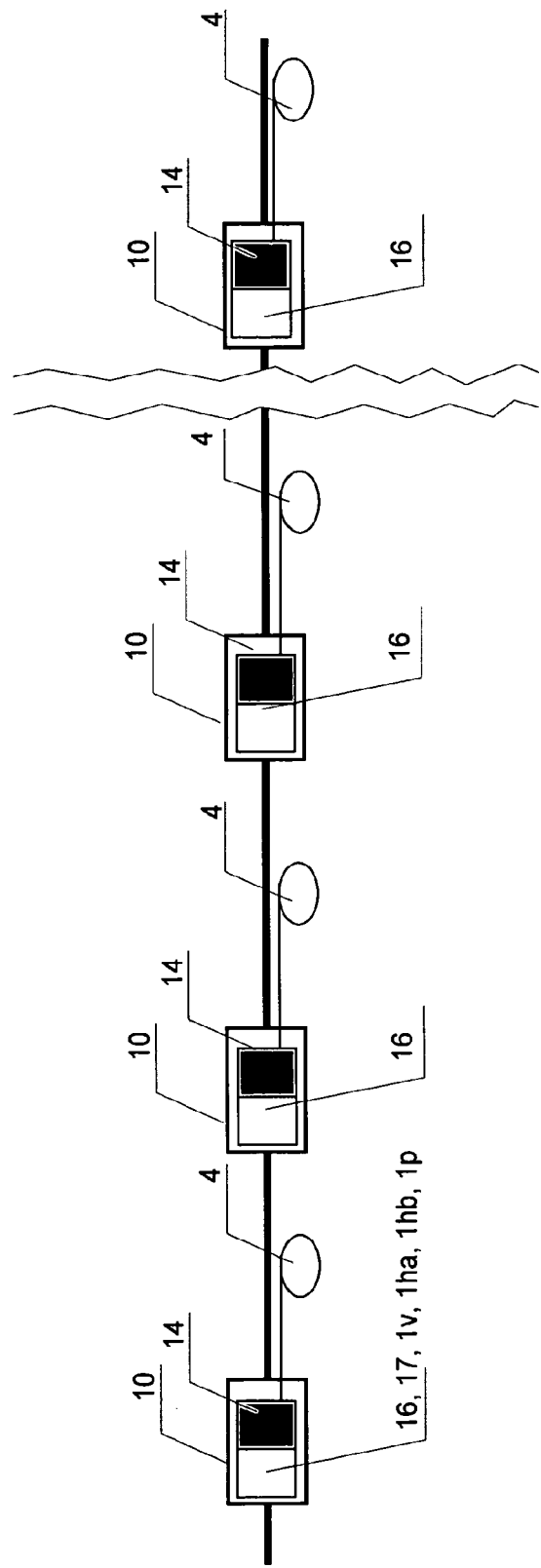
FIG. 4 illustrates an embodiment of which separate electronic packages containing both seismic and EM electronic units are arranged along a receiver cable, in which each of the packages are provided with an EM electrode. The cable connecting the packages provides voltage, power and signal lines.

FIG. 4 illustrates an embodiment of which separate electronic packages containing both seismic 16 and EM electronic 14 units are arranged along a cable, in which each of the packages is provided with an EM electrode 4. The cable segments connecting the packages provides voltage, power and signal lines.

Borehole Receiver Cable

Figure 6:
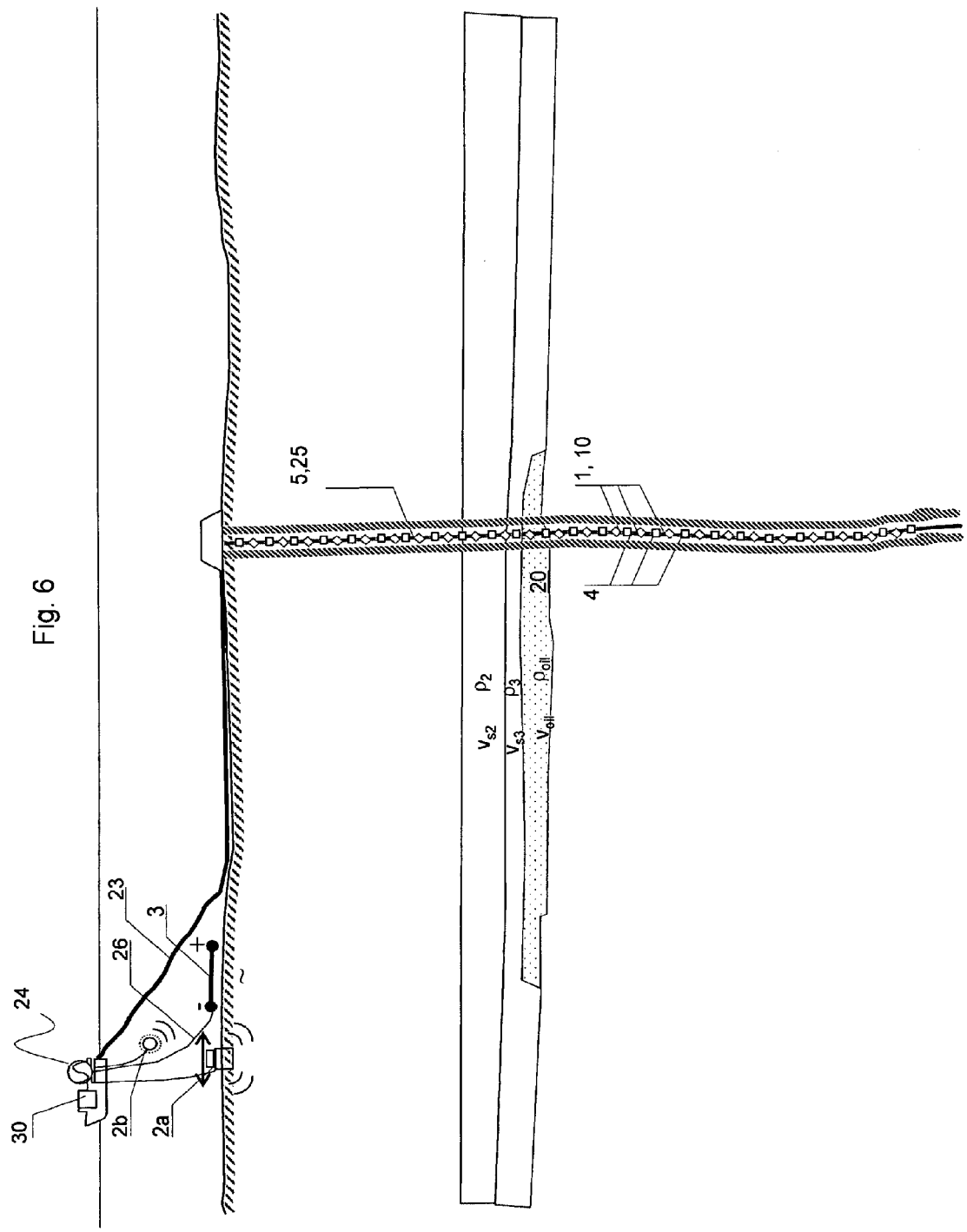
FIG. 6 illustrates a receiver cable comprising separate instrument unit cans adapted to resist pressure and otherwise rough borehole conditions, the instrument unit cans arranged adjacent to the wall in a borehole or a petroleum well.

In one alternatively preferred embodiment of the invention, illustrated in FIG. 6, the receiver cable 5 comprising separate instrument unit cans 10 adapted to resist pressure and otherwise rough borehole conditions is arranged adjacent to the wall in a borehole or a petroleum well. The cable comprises seismic sensors 1 and EM sensor electrodes 4. The pressure resistant cans 10 are connected by signal and voltage conducting cable sections 15b, with the cable 5 being arranged in a borehole or petroleum well outside of any conductive casing. The top end of the cable can be connected to a vessel or a platform for online signal retrieval and/or analysis. The borehole cable can be permanently arranged in the borehole for monitoring purposes. The concept can also be applied in a non-cased borehole. Then the seismic stations units are clamped to the borehole wall (as in normal well seismic/VSP tools) while the electrode may be clamped or not (resting in the borehole fluid.

The invention claimed is:

1. A marine geophysical acquisition system comprising:
   one or more seismic signal sources to be arranged in a sea or at a seafloor for emitting seismic signals;
   a plurality of seismic sensors for sensing propagated seismic signals emitted from said one or more seismic signal sources, said seismic sensors being arranged on a receiver cable to be extended in the sea;
   one or more electromagnetic (EM) signal sources arranged in the sea, or on the sea floor, for emitting EM-signals, said one or more EM signal sources being provided with electrical power through an insulated electric cable connected to an electric signal generator aboard a marine vessel;
   a plurality of electromagnetic sensor electrodes for sensing EM-signals propagated from said one or more EM-signal sources, said EM sensor electrodes being arranged along and on said receiver cable, wherein said receiver cable includes a plurality of electronic units, each electronic unit including a voltage amplifier having a first voltage input line to be connected to a first one of said EM sensor electrodes and a second voltage input line to be connected to a second one of said EM sensor electrodes, said EM sensor electrodes being arranged at a generally fixed distance relative to said seismic sensors along said receiver cable.

2. The marine geophysical acquisition system of claim 1, wherein said receiver cable includes a lead-in, umbilical or riser cable extending from the vessel.

3. The marine geophysical acquisition system of claim 2, wherein said receiver cable is arranged so as to have a negative buoyancy for residing on the seafloor at least during data acquisition using said EM sensor electrodes.

4. The marine geophysical acquisition system of claim 1, wherein said one or more EM signal sources is positioned in a same plane, or close to the same plane, as a longitudinal axis of said receiver cable with said plurality of electromagnetic sensor electrodes, said receiver cable being generally linear in a vertical projection on a horizontal plane.

5. The marine geophysical acquisition system of claim 4, wherein said one or more EM signal sources is bipolar, and includes a bipolar axis in the same plane as said receiver cable.

6. The marine geophysical acquisition system of claim 1, wherein said first voltage input line is connected to said first one of said EM sensor electrodes, said voltage amplifier having an output connected to an analog-to-digital signal converter and being operable to amplify an alternating voltage difference between at least two of said EM sensor electrodes.

7. The marine geophysical acquisition system of claim 1, wherein said receiver cable is provided with a common ground line, one or more of said EM sensor electrodes being arranged to be connectable through a first switch to said common ground line so as to form a reference ground voltage for one or more other EM sensor electrodes.

8. The marine geophysical acquisition system of claim 7, wherein said one or said EM sensor electrodes is connectable via a second switch to said second voltage input line and is further connectable through a third switch to a local ground line to a corresponding switch on a nearest-neighbour electronic unit, said corresponding switch being further connected to a second voltage input line of a voltage amplifier of said nearest-neighbour electronic unit.

9. The marine geophysical acquisition system of claim 8, wherein said one of said EM sensor electrodes and an EM sensor electrode of said nearest-neighbour electronic unit are arranged to measure one or more varying voltage signals in an environment, wherein said first switch is open, said second switch is closed, and said third switch is closed so as to connect with said local ground line to said corresponding switch connected to said second voltage input line of said voltage amplifier on said nearest-neighbour electronic unit.

10. The marine geophysical acquisition system of claim 8, wherein the analog-to-digital signal converter is operable to digitize an amplified varying voltage signal to a digitized voltage signal and transmit said digitized voltage signal along a main signal line to a data storage means arranged on said vessel for storage and analysis of said digitized voltage signal.

11. The marine geophysical acquisition system of claim 9, wherein an EM sensor electrode of one of said electronic units comprises a common reference electrode for measuring a varying voltage signal in the environment, wherein a first switch of said one of said electronic units is closed so as to connect said common reference electrode to said common ground line, and wherein a second switch of another of said electronic units is closed so as to connect a second input line of an amplifier of said another of said electronic units to said common ground line so as to measure a varying signal on an EM sensor electrode of said another of said electronic units.

12. The marine geophysical acquisition system of claim 1, wherein said receiver cable has a flexible, electrically insulating and water-proof outer skin.

13. The marine geophysical acquisition system of claim 12, wherein said receiver cable skin is generally continuous over generally an entire length of said receiver cable, and includes a cavity or a series of fluid-containing cavities containing said electronic units, said EM sensor electrodes being arranged with one surface extending on an outside of said skin to be in direct electrical contact with the sea or the seafloor.

14. The marine geophysical acquisition system of claim 1, wherein said receiver cable is made from two or more receiver cable sections.

15. The marine geophysical acquisition system of claim 14, wherein each of said receiver cable sections comprises both EM sensor electrodes and seismic sensors.

16. The marine geophysical acquisition system of claim 14, wherein said receiver cable sections include EM receiver cable sections, said EM receiver cable sections generally comprising EM sensor electrodes, each of said EM receiver cable sections being arranged in line with and between seismic receiver sections generally comprising seismic sensors.

17. The marine geophysical acquisition system of claim 1, wherein said receiver cable comprises separate instrument unit cans comprising seismic sensors and EM sensor electrodes, said cans being connected by signal and voltage conducting cable sections.

18. The marine geophysical acquisition system of claim 3, wherein said receiver cable is arranged as a fixed array of sensors in a line or in a grid on the seafloor.

19. The marine geophysical acquisition system of claim 1, wherein said one or more seismic signal source is a seismic P- or S-wave vibrator source having a horizontal or vertical polarization arranged on the seafloor or in the seabed.

20. The marine geophysical acquisition system of claim 1, wherein said seismic source is an airgun.

21. The marine geophysical acquisition system of claim 1, wherein said one or more electromagnetic signal source comprises two electric transmitter electrodes arranged so as to be separated in the sea, said transmitter electrodes being provided with a desired electric voltage and current signal through a pair of insulated electric cables from said electric signal generator.

22. The marine geophysical acquisition system of claim 1, wherein said receiver cable comprises seismic electronic units including one or more seismic electronic amplifiers for amplifying seismic sensor output signals, and A/D converters for digitizing an amplified voltage signal from said seismic electronic amplifiers to digitized seismic voltage signals and transmitting said digitized seismic voltage signals along a main signal line to a data storage means arranged on said vessel for storage and analysis of said digitized seismic voltage signals.

23. The marine geophysical acquisition system of claim 1, wherein said one or more EM signal sources are arranged directly on the seafloor in order to prevent sea-water signal loss in a downward propagating electromagnetic wave.

24. The marine geophysical acquisition system of claim 3, wherein a data storage unit is arranged with said receiver cable on the seafloor to be retrieved by a vessel after a traversal of said receiver cable by said one or more EM signal source and said one or more seismic signal source.

25. The marine geophysical acquisition system of claim 23, wherein a data storage unit is arranged remotely from said receiver cable for online data retrieval during data acquisition while said one or more EM signal source and said one or more seismic signal source traverses said receiver cable.

26. The marine geophysical acquisition system of claim 9, wherein said analog-to-digital signal converter is operable to digitize an amplified varying voltage signal to a digitized voltage signal and transmit said digitized voltage signal along a main signal line to a data storage means arranged on said vessel for storage and analysis of said digitized voltage signal.

* * * * *